United States Patent
Moreau et al.

(10) Patent No.: US 8,784,075 B2
(45) Date of Patent: Jul. 22, 2014

(54) VENTILATING DEVICE

(75) Inventors: Stéphane Moreau, Paris (FR); Manuel Henner, Auffargis (FR); Bruno Demory, Vaureal (FR)

(73) Assignee: Valeo Systemes d'Essuyage, La Verriere (FR)

( * ) Notice: Subject to any disclaimer, the term of this patent is extended or adjusted under 35 U.S.C. 154(b) by 656 days.

(21) Appl. No.: 10/551,624

(22) PCT Filed: Apr. 1, 2004

(86) PCT No.: PCT/EP2004/003436
§ 371 (c)(1),
(2), (4) Date: Jun. 26, 2006

(87) PCT Pub. No.: WO2004/088142
PCT Pub. Date: Oct. 14, 2004

(65) Prior Publication Data
US 2006/0280625 A1    Dec. 14, 2006

(30) Foreign Application Priority Data
Apr. 2, 2003    (FR) ..................... 03 04119

(51) Int. Cl.
F04B 39/06    (2006.01)
F04B 35/04    (2006.01)
F04D 25/08    (2006.01)
H02K 9/06    (2006.01)
F04D 29/64    (2006.01)

(52) U.S. Cl.
CPC .............. *F04D 25/082* (2013.01); *H02K 9/06* (2013.01); *F04D 29/646* (2013.01)
USPC .................. 417/366; 417/423.14; 417/423.15

(58) Field of Classification Search
CPC ............................ F04D 25/082; H02K 9/06
USPC .............. 417/366, 423.8, 368, 369, 360, 363, 417/423.14, 423.15; 310/58–62, 52, 51, 91
See application file for complete search history.

(56) References Cited

U.S. PATENT DOCUMENTS 2,838,262 A * 6/1958 Anderson .................. 248/603
3,143,284 A * 8/1964 Napoleon et al. .......... 417/363
(Continued)

FOREIGN PATENT DOCUMENTS

JP    6129100    2/1986
JP    62134000    8/1987
(Continued)

OTHER PUBLICATIONS

Mechanical Engish Translation of WO Patent Application No. 02/33264 filed Apr. 25, 2002, 9 pages.

(Continued)

*Primary Examiner* — Charles Freay
*Assistant Examiner* — Alexander Comley

(57) ABSTRACT

A ventilation device is disclosed including a fan capable of being driven rotationally by an open electric motor which is firmly attached to a support intended for fixing said ventilation device, the fan having a plurality of blades which are distributed regularly around a bowl inside which there are arranged internal ribs capable of ventilating the open electric motor. Notably, the support includes a central part which is connected in a substantially sealed manner to at least one peripheral portion of the open electric motor.

7 Claims, 4 Drawing Sheets

(56) References Cited

U.S. PATENT DOCUMENTS

| | | | |
|---|---|---|---|
| 3,303,995 A * | 2/1967 | Boeckel | 417/353 |
| 4,210,833 A * | 7/1980 | Neveux | 310/58 |
| 5,055,006 A * | 10/1991 | Kobayashi et al. | 417/366 |
| 5,133,617 A * | 7/1992 | Sokn et al. | 403/349 |
| 5,236,306 A * | 8/1993 | Hozak | 416/93 R |
| 5,489,186 A * | 2/1996 | Yapp et al. | 415/58.7 |
| 5,533,704 A * | 7/1996 | Fischinger et al. | 248/603 |
| 5,944,497 A * | 8/1999 | Kershaw et al. | 417/423.8 |
| 5,967,764 A * | 10/1999 | Booth et al. | 417/423.8 |
| 6,027,307 A * | 2/2000 | Cho et al. | 415/173.5 |
| 6,384,494 B1 * | 5/2002 | Avidano et al. | 310/58 |
| 6,755,157 B1 * | 6/2004 | Stevens et al. | 123/41.49 |
| 2002/0187059 A1 * | 12/2002 | Gold et al. | 417/366 |
| 2006/0280625 A1 * | 12/2006 | Moreau | 417/366 |

FOREIGN PATENT DOCUMENTS

| | | |
|---|---|---|
| JP | 222051 | 2/1990 |
| JP | 09126197 A | 5/1997 |
| WO | 0233264 A1 | 4/2002 |

OTHER PUBLICATIONS

Japanese Written Hearing by Appeal Board for Japanese Application No. 2006-504,939, dated Aug. 9, 2011 (6 pages).

Patent Abstract for Japanese Application No. 09-126197, Published May 13, 1997 (1 page).

* cited by examiner

VENTILATING DEVICE

The present invention concerns a ventilation device intended to convert, into an air movement, the kinetic energy which is supplied to a fan by an electric motor.

The invention finds a particularly advantageous, but not exclusive, application in the automotive field in particular for providing the engine cooling function.

Conventionally, a ventilation device essentially consists of a fixing support intended furthermore to hold an electric motor responsible for rotationally driving a fan. In concrete terms, the fan consists of a plurality of blades distributed regularly around a bowl which is firmly attached to the transmission shaft of the electric motor, said motor itself being firmly attached to the support. In a manner just as usual, the support consists of a central part which is held by support arms substantially in the middle of a peripheral part, forming a frame. The function of the central part is to serve as a support for fixing the electric motor.

In the ventilation devices of the prior art, the central part of the support generally has an annular shape, the central hole of which is capable of receiving the electric motor in an axial position. The fixing proper of the electric motor with respect to the support is performed by means of regularly distributed lugs, for example three lugs disposed at 120°. Each fixing lug is firmly attached to the electric motor and is fixed on the central part of the support.

In practice, this assembly method is conceived only by using a significant clearance between the inner edge of the central ring and the electric motor. This is because, from an industrial point of view, the fitting of a ventilation device must be as quick as possible. It is consequently out of the question that the operators have to use force to put the motor in place inside the central ring. This is why, at the present time, the supports are shaped so that there always exists a relatively large clearance between the inner edge of the central ring and the electric motor, of the order of 3 to 10 mm. This characteristic furthermore allows manufacturers to be able to adapt different electric motors on the same support, according to the envisaged application.

Another particular feature of the ventilation devices of the prior art lies in the fact that the electric motor is generally of the open type. This means that there is air circulating through the various components constituting the motor, and in particular between the armature and the field winding. Of course, the numerous passages present inside the motor open onto the outside, directly or via through openings when the ends of the passages in question end at a housing for example.

However, in the field of open electric motors, it is necessary to be aware that the best efficiency is obtained at low temperatures, the magnetic and Joule losses becoming much greater as the temperature rises. A low operating temperature also makes it possible to improve the life of the motor significantly.

In order to lower the operating temperature of an open electric motor, the use is known of a fan equipped with a ribbed bowl. The set of internal ribs act as a centrifugal pump which, on the one hand, advantageously generates a flow from rear to front inside the electric motor and, on the other hand, discharges said flow out of the bowl.

In practice, this type of ventilation device has however the drawback of not providing a satisfactory level of cooling to the electric motor, which is detrimental in terms of efficiency but also of reliability. This is because the rotation of the ribs arranged inside the bowl indeed creates a flow of air through the electric motor, but its rate is insufficient for cooling said motor optimally. The reason for this comes from the fact that the intake, which is created by the internal ribs being rotated, does not generate a flow only in the electric motor. It also creates a flow through the relatively large clearance which exists between the central part of the support and the electric motor. There is therefore a dual intake, and in fact, the rate of the air flow inside the motor is considerably reduced.

Therefore the technical problem to be solved, by the object of the present invention, is to propose a ventilation device comprising a fan capable of being driven rotationally by an open electric motor which is firmly attached to a support intended for fixing said ventilation device, the fan consisting of a plurality of blades which are distributed regularly around a bowl inside which there are arranged internal ribs capable of ventilating said open electric motor, a ventilation device which would make it possible to avoid the problems of the prior art by providing the electric motor with substantially improved cooling.

The solution to the technical problem posed consists, according to the present invention, in that the support comprises a central part which is connected in a substantially sealed manner to at least one peripheral portion of the open electric motor. This means in other words that the central part of the support is in a position to cooperate by continuous contiguous contact with at least one peripheral portion of the open electric motor.

The invention as thus defined has the advantage of not comprising any significant clearance between the central part of the support and the electric motor. Compared to its equivalents of the prior art, the central part has been extended as far as the electric motor so as to limit the inputs of air at that level as much as possible. The action of the rotating internal ribs is now concentrated only on the electric motor, so that the air flow which passes through it is consequently considerably increased, to the benefit of the motor cooling.

The present invention also concerns the characteristics which will emerge in the course of the following description, and which must be considered individually or in all their possible technical combinations.

This description, given by way of a non-limiting example, will make it understood better how the invention can be implemented, with reference to the accompanying drawings in which.

Figure 3:
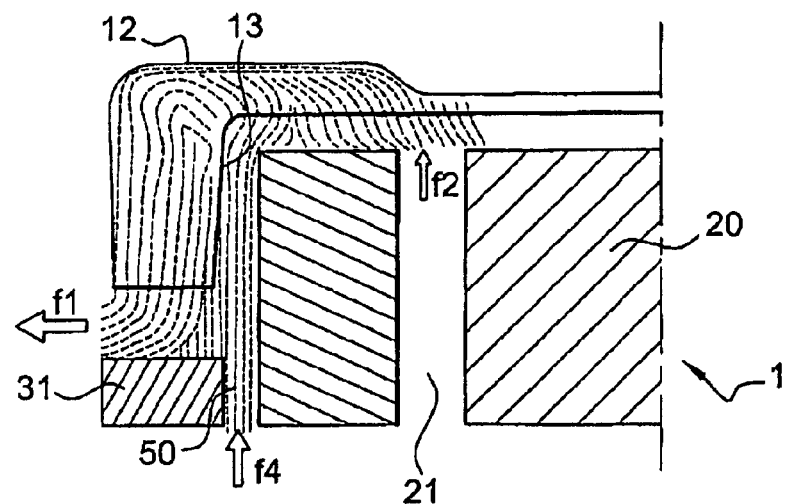
FIG. 3 depicts schematically, in axial section, a ventilation device of the prior art.
Figure 4:
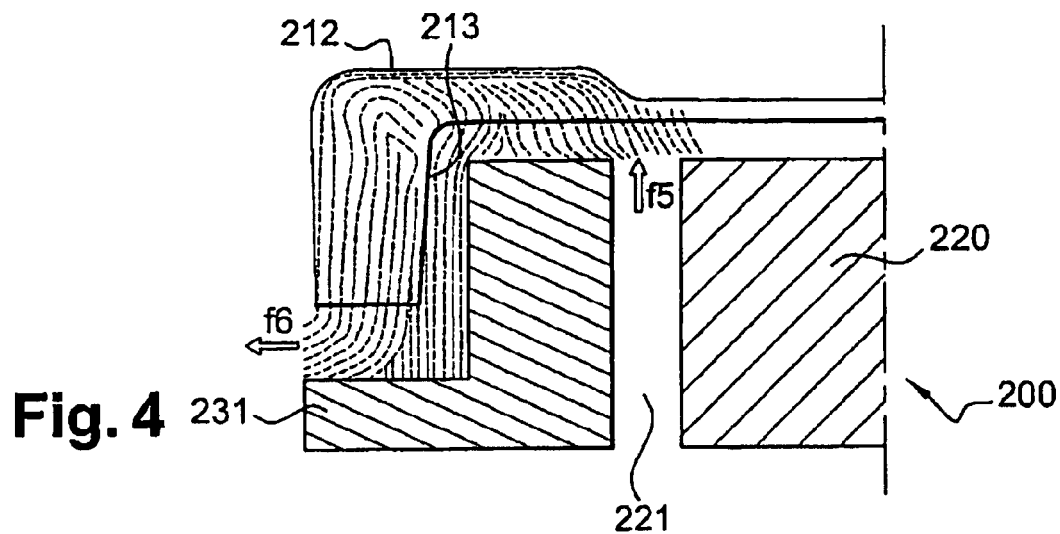

FIG. 4 constitutes a view similar to FIG. 3, which illustrates for comparison a ventilation device in accordance with the invention.

Figure 5:
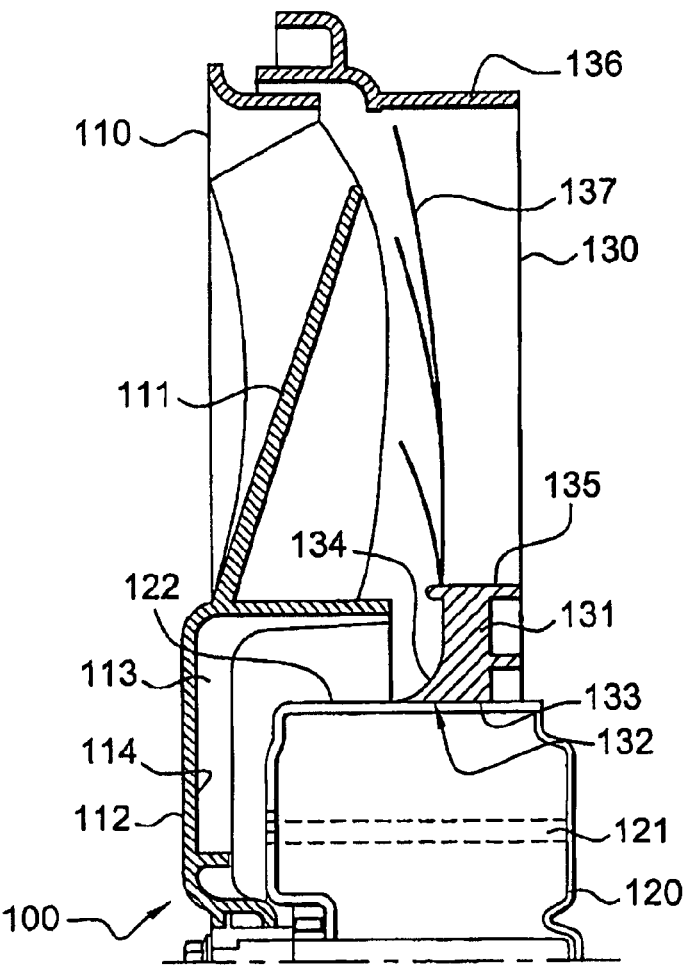

FIG. 5 shows in axial section, and partially, a ventilation device according to a first embodiment of the invention.

Figure 6:
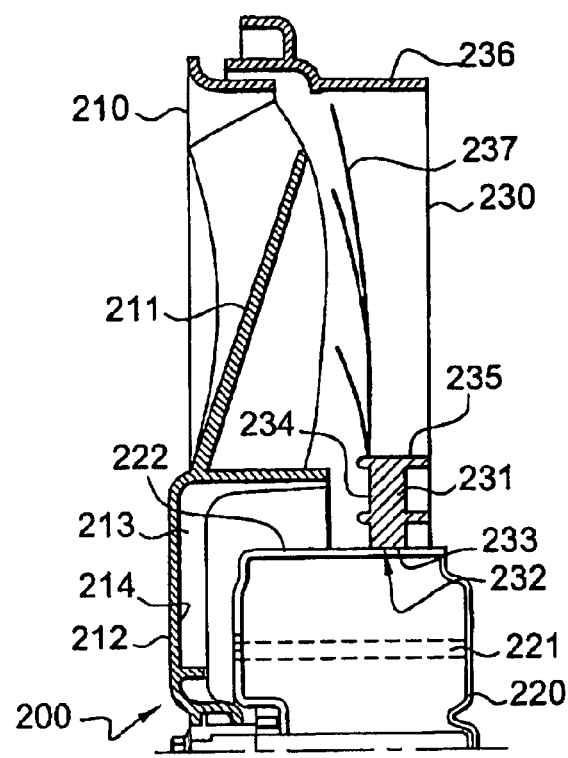

FIG. 6 is a view similar to FIG. 5, which illustrates a ventilation device according to a second embodiment of the invention.

Figure 7:
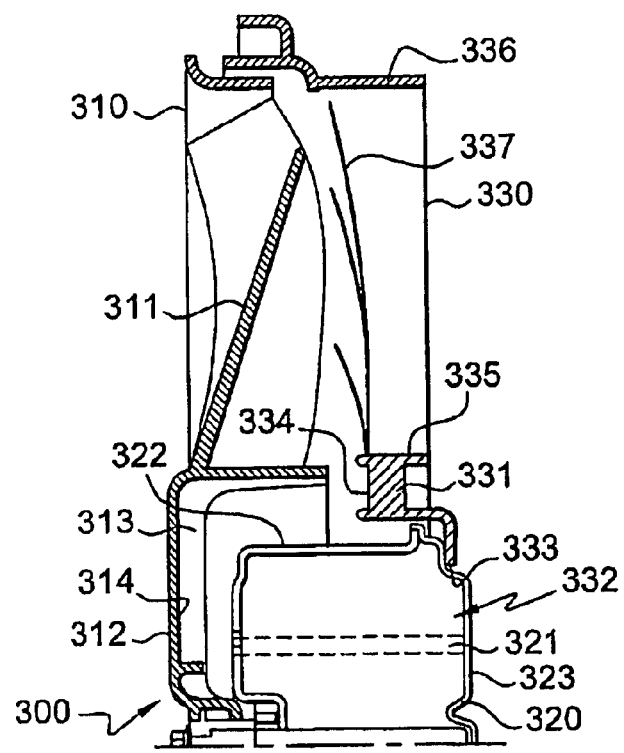

FIG. 7 constitutes a view similar to FIGS. 5 and 6, which depicts a ventilation device according to a third embodiment of the invention.

Figure 8:
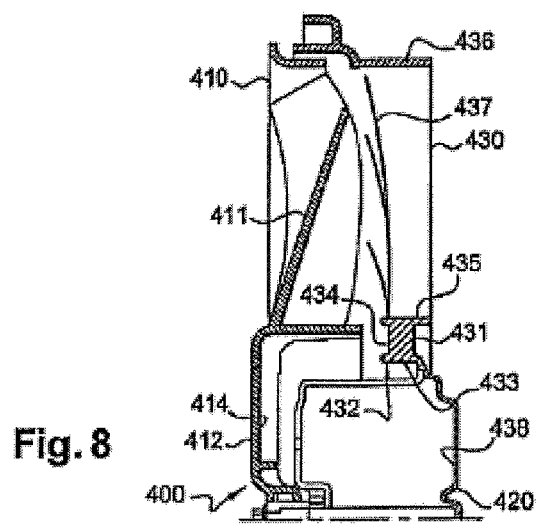

FIG. 8 is a view similar to FIGS. 5 to 7, which shows a ventilation device according to a fourth embodiment of the invention.

For reasons of clarity, the same elements have been designated by identical references. Similarly, only the elements essential for understanding the invention have been depicted, not-to-scale and schematically.

Figure 1:
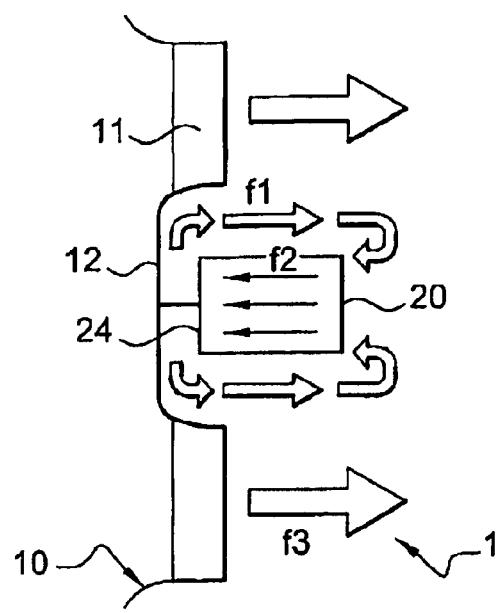
FIG. 1 illustrates schematically the air flows generated during the use of a ventilation device.
Figure 2:
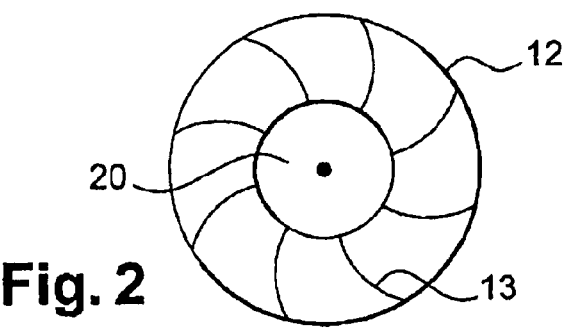
FIG. 2 is a partial rear view of the ventilation device of FIG. 1.

FIGS. 1 and 2 make it possible to better visualise the air flows generated during the rotation of a fan 10, the bowl 12 of which is provided with internal ribs 13, but also to better understand how the cooling of an open electric motor 20 takes place when the latter is coupled with said fan 10.

In these schematic depictions, the relative positioning of the electric motor 20 with respect to the fan 10, and in particular its axial centring with respect to the ribbed bowl 12, are clearly distinguished. When the fan 10 is driven rotationally by the electric motor 20, the internal ribs 13 stir the air present inside the bowl 12. This air will consequently be driven back towards the outside (arrows f1) under the effect of the aerodynamic force induced by the internal ribs 13 which centrifuges the air. Concomitantly, this same aerodynamic force will draw in the air which is situated inside the electric motor 20, thus creating numerous continuous flows (arrows f2) through the various components of said electric motor 20. Once they have reached the front part 24 of the motor 20, that is to say the inside of the bowl 12, these air flows will in their turn be centrifuged and then discharged to the outside. Simultaneously, the blades 11 of the fan 10 fully play their part by driving back a large amount of air towards the rear (arrows f3).

FIGS. 3 and 4 illustrate respectively, for comparison, a ventilation device 1 of the prior art and a ventilation device 200 in accordance with the invention. In both cases, the electric motor 20, 220 is of the open type, a passage 21, 221 being depicted schematically in order to symbolise the flow of the air inside said motor (arrows f2, f5). Moreover, each electric motor 20, 220 is supported by a central part 31, 231.

In accordance with FIG. 3, the clearance existing between the central part 31 and the electric motor 20 constitutes a subsidiary passage 50 in which a subsidiary air flow (arrow f4) circulates. It can clearly be seen that the centrifugal force, created by the internal ribs 13 being rotated, does not draw in only at the motor 20, but also exercises its action through the subsidiary passage 50. This dual intake (arrows f2 and f4) consequently reduces the rate of flow of the air inside the motor (arrow f2), the output rate f1 corresponding to the sum of the rate through the motor (arrow f2) and the rate through the subsidiary passage (arrow f4). It has even been demonstrated that the flow through the clearance could be dominant compared with that coming from the motor 20.

As can be seen in FIG. 4, the contiguous fitting between the central part 231 and the electric motor 220 advantageously makes it possible to eliminate the subsidiary air flow. The action of the aerodynamic force is now exerted only on the electric motor 220 alone. The rate of the corresponding flow (arrow f5) is consequently increased in significant proportions and henceforward corresponds to the output rate (arrow f6). In practice, it has been measured that an increase of over 50% was perfectly conceivable.

FIG. 5 illustrates a ventilation device 100 comprising a fan 110 capable of being driven rotationally by an open electric motor 120 which is itself firmly attached to a support 130 intended for fixing said ventilation device 100. As for the fan 110, this consists of a plurality of blades 111 which are distributed regularly around a bowl 112 inside which there are arranged internal ribs 113 capable in particular of ventilating the open electric motor 120, a passage 121 of which has been depicted schematically.

In accordance with the object of the present invention, the support 130 comprises a central part 131 which is connected in a substantially sealed manner to a peripheral portion of the open electric motor 120.

In this first embodiment, the central part 131 of the support 130 comprises a through hole 132 which is intended to receive the open electric motor 120 and the cross-section of which is substantially complementary to that of said open electric motor 120. The fact that the cross-sections are substantially complementary means that the corresponding contact surfaces, respectively of the central part 131 and of the electric motor 120, do not necessarily cooperate by contiguous contact totally continuously. In other words, a possible clearance and/or one or more gaps may exist between the central part 131 and the electric motor 120. However, the dimensions of these free spaces are so minimal compared with the surfaces placed in contact that their presence has only a negligible impact compared with an ideal embodiment in which the contact would be perfectly continuous.

However, and particularly advantageously, the through hole 132 is here delimited by an inner edge 133 which cooperates by continuous contiguous contact with a portion of the peripheral surface of the open electric motor 120. This means that the through hole 132 hugs the circumference of the electric motor 120 as closely as possible. Neither clearance nor gap exists between the inner edge 133 and the peripheral surface of the electric motor 120.

The second and third embodiments, illustrated respectively in FIGS. 6 and 7, also have these particular features. However, the first and second embodiments of FIGS. 5 and 6 are distinguished by the fact that the inner edge 133, 233, which delimits the through hole 132, 232, cooperates by continuous contiguous contact with the lateral wall 122, 222 of the open electric motor 120. As for the third embodiment of FIG. 7, this is marked out owing to the fact that the inner edge 333, which delimits the through hole 332, cooperates by continuous contiguous contact with a peripheral portion of the rear part 323 of the electric motor 320.

FIG. 8 illustrates a ventilation device 400 according to a fourth embodiment. The support 430 is here equipped with a central part 431 in which there is arranged a blind hole 432 which is capable of at least partially receiving the open electric motor 420. The assembly is arranged so that the bottom 438 of the blind hole 432 is positioned substantially opposite the rear part of the open electric motor 420. The bottom 438 thus extends continuously behind the electric motor 420, so that it naturally forms a kind of screen capable of guaranteeing the sealing of the central part 431, in particular as regards said electric motor 420, in accordance with the object of the present invention.

According to a particular feature of this fourth embodiment, the bottom 438 of the blind hole 432 is firmly attached to the rear part of the open electric motor 420. In practice, this firm attachment can be obtained by any known assembly means. By way of example, the rear plate of the electric motor 420 can be overmoulded in the bottom 438 of the blind hole 432.

In the example embodiment of FIG. 8, the rear plate of the electric motor 420 and the central part 431 can even constitute only one and the same component. Thus, according to another particular feature of this fourth embodiment, the bottom 438 of the blind hole 432 is capable of constituting the rear part, forming a plate, of the open electric motor 420.

On the assumption that the inner edge 133, 233, 333 cooperates by continuous contiguous contact with any portion whatsoever of the peripheral surface of the open electric motor 120, 220, 320, it can be advantageous that the central part 131, 231, 331 of the support 130, 230, 330 can hold said electric motor 120, 220, 320 by clipping. For this, the corresponding contact surfaces must be suitably shaped in order to be able to fit one inside the other by mutual deformation.

In accordance with an advantageous characteristic of the invention, which is used in the first three embodiments chosen to illustrate the invention, the central part 131, 231, 331 of the support 130, 230, 330 is capable of holding the open electric motor 120, 220, 320 by tight fitting. The cross-section of the through hole 132, 232, 332 is here very slightly smaller than that of the open electric motor 120, 220, 320, so that, after having been forcibly pushed in, said electric motor 120, 220, 320 is in a position to be immobilised by the gripping exerted by the central part 131, 231, 331.

Whether the assembly of the electric motor 120, 220, 320 in the central part 131, 231, 331 is carried out by clipping, by tight fitting or by any other means, it is always possible to supplement this immobilisation by fixing by means of conventional lugs. Overmoulding would even be perfectly conceivable, as in the case of the fourth embodiment described previously.

According to a particular feature of the first embodiment which can be seen in FIG. 5, the central part 131 comprises a so-called active surface 134, which is positioned opposite the bottom 114 of the bowl 112 and which has a concave shape capable of facilitating the flow of the air from the inside to the outside of the bowl 112. The central part 131 is here really shaped in order to reduce as much as possible the aerodynamic disturbances at the support 130, and in particular recirculation phenomena and/or eddies. Discharging of the air flow coming from inside the bowl 112 is thus carried out in a substantially optimised manner.

In this example embodiment, the active surface 134 of the central part 131 has a cross-section in the shape of a quarter of a circle whose two ends extend respectively, on the one hand, substantially axially at the inner edge 133 of the central part 131 and, on the other hand, substantially transversally at the outer edge 135 of said central part 131. The active surface 134 has so to speak a shape which is substantially complementary to a portion of a cylinder of revolution whose profile would be a quarter round. Be that as it may, the fitting of the electric motor 120 is carried out here advantageously from the rear of the support 130.

According to a particular feature of the second embodiment which can be seen in FIG. 6, the central part 231 comprises a so-called active surface 234, which is positioned opposite the bottom 214 of the bowl 212 and which has a substantially flat shape extending substantially linearly. In this example embodiment, the active surface 234 is furthermore parallel to the bottom 214 of the bowl 212. Be that as it may, the fitting of the electric motor 220 is carried out here either from the rear or from the front of the support 230.

According to a particular feature of the third and fourth embodiments, which can be seen in FIG. 7, the central part 331, 431 comprises a so-called active surface 334, 434, which is positioned opposite the bottom 314, 414 of the bowl 312, 412 and which extends discontinuously. In this example embodiment, each portion of the active surface 334, 434 is furthermore parallel to the bottom 314, 414 of the bowl 312, 414. Be that as it may, the fitting of the electric motor 320, 420 is carried out advantageously here from the front of the support 330, 430.

According to a currently preferred embodiment of the invention, the central part 131, 231, 331, 431 has an annular shape, the outer edge 135, 235, 335, 435 of which extends substantially opposite that of the bowl 112, 212, 312, 412, and the inner edge 133, 233, 333, 433 of which delimits a hole 132, 232, 332, 432 of circular cross-section. This implies that the associated electric motor 120, 220, 320, 420 is cylindrical. Which is generally always the case in practice.

According to another particular feature of the invention, the support 130, 230, 330, 430 also comprises a peripheral part 136, 236, 336, 436, forming a frame, which is connected to the central part 131, 231, 331, 431 by at least one support arm 137, 237, 337, 437. In practice, the central part 131, 231, 331, 431 is held substantially in the middle of the peripheral part 136, 236, 336, 436 by means of several support arms 137, 237, 337, 437 which are distributed regularly so that the rigidity of the assembly is uniform. The number of these support arms 137, 237, 337, 437 must however remain as limited as possible in order to disrupt only as little as possible the flow of air generated by the blades 111, 211, 311, 411 of the fan 110, 210, 310, 410.

Of course the invention applies to any application using at least one ventilation device 100, 200, 300, 400 comprising a fan 110, 210, 310, 410 driven by an open electric motor 120, 220, 320, 400.

Thus therefore, the invention concerns in particular any engine cooling system comprising at least one ventilation device 100, 200, 300, 400 as previously described. A cooling system for a motor vehicle, which essentially consists of at least one heat exchanger coupled to at least one such ventilation device 100, 200, 300, 400, is for example thought of here.

Similarly, the invention also applies to any motor vehicle equipped with at least one ventilation device 100, 200, 300, 400 as described previously. It must furthermore be noted that the notion of motor vehicle concerns here any vehicle with an engine, that is to say any movable machine capable of progressing by itself with the help of an engine, irrespective of the type of said engine and independently of the size and/or weight of said vehicle. Consequently, a motor vehicle can equally well refer to a car, a lorry or a bus for example.

The invention claimed is:

1. A ventilation device comprising: a fan capable of being driven rotationally by an open electric motor which is firmly attached to a support intended for fixing said ventilation device, the fan consisting of a plurality of blades which are distributed regularly around a bowl inside which there are arranged internal ribs capable of ventilating said open electric motor, wherein the support comprises a central part which is connected in a substantially sealed manner to at least one peripheral portion of the open electric motor, the central part of the support comprising a hole configured to receive, at least partially, said motor, wherein said central part of the support consists of a component having an annular shape and is configured to hold said motor, wherein the hole comprises a through hole, the cross-section of which is substantially complementary to and slightly smaller than that of the open electric motor, said through hole configured to receive said open electric motor, wherein the through hole is delimited by an inner edge, wherein the inner edge of the through hole is in continuous contiguous contact with an entire circumference of a lateral wall of the open electric motor, wherein the central part of the support is capable of holding the electric motor by tight fitting, wherein the tight fitting results from the open electric motor being forcibly pushed into the through hole in a position to be immobilized by a gripping exerted by the central part of the support, wherein the central part comprises an active surface, which is positioned opposite a bottom of the bowl and which has a concave shape capable of facilitating a flow of the air from an inside to an outside of said bowl, and wherein the active surface of the central part has a cross-section in the shape of a quarter of a circle whose two ends extend respectively substantially axially at the inner edge of the central part, and substantially transversally at an outer edge of said central part.

2. A ventilation device according to claim 1, wherein the central part comprises an active surface, which is positioned opposite the bottom of the bowl and which has a substantially flat shape extending substantially linearly.

3. A ventilation device according to claim 1, wherein the central part has an annular shape, the outer edge of which extends substantially opposite that of the bowl, and the inner edge of which delimits a hole of circular cross-section.

4. A ventilation device according to claim 1, wherein the support also comprises a peripheral part, forming a frame, which is connected to the central part by at least one support arm.

5. An engine cooling device, wherein the engine cooling device comprises at least one ventilation device according to claim 1.

6. A motor vehicle, wherein the motor vehicle comprises at least one ventilation device according to claim 1.

7. A ventilation device comprising: a fan capable of being driven rotationally by an open electric motor which is firmly attached to a support intended for fixing said ventilation device, the fan consisting of a plurality of blades which are distributed regularly around a bowl inside which there are arranged internal ribs capable of ventilating said open electric motor, wherein the support comprises a central part which is connected in a substantially sealed manner to at least one peripheral portion of the open electric motor, the central part of the support comprising a hole configured to receive, at least partially, said motor, wherein said central part of the support consists of a component having an annular shape and is configured to hold said motor, wherein the hole comprises a through hole, the cross-section of which is substantially complementary to that of the open electric motor, said through hole configured to receive said open electric motor, wherein the through hole is delimited by an inner edge, wherein the inner edge of the through hole is in continuous contiguous contact with an entire circumference of a lateral wall of the open electric motor, wherein the central part of the support is capable of holding the electric motor by clipping, wherein the clipping results from the inner edge of the through hole and the entire circumference of the lateral wall of the open electric motor fitting inside each other by mutual deformation, wherein the central part comprises an active surface, which is positioned opposite a bottom of the bowl and which has a concave shape capable of facilitating a flow of the air from an inside to an outside of said bowl, and wherein the active surface of the central part has a cross-section in the shape of a quarter of a circle whose two ends extend respectively substantially axially at the inner edge of the central part, and substantially transversally at an outer edge of said central part.

\* \* \* \* \*